US011846762B2

(12) United States Patent
Im et al.

(10) Patent No.: US 11,846,762 B2
(45) Date of Patent: Dec. 19, 2023

(54) CAMERA MODULE AND STRUCTURE TO SWITCH LIGHT PATH

(71) Applicant: SAMSUNG ELECTRO-MECHANICS CO., LTD., Suwon-si (KR)

(72) Inventors: Ah Hyeon Im, Suwon-si (KR); Ta Kyoung Lee, Suwon-si (KR); Jung Woo Kim, Suwon-si (KR); Do Seop Hwang, Suwon-si (KR); Kyeong Jun Kim, Suwon-si (KR); Jae Hyuk Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 11 days.

(21) Appl. No.: 17/382,576

(22) Filed: Jul. 22, 2021

(65) Prior Publication Data

US 2022/0075161 A1   Mar. 10, 2022

(30) Foreign Application Priority Data

Sep. 9, 2020   (KR) .................. 10-2020-0115690
Feb. 10, 2021   (KR) .................. 10-2021-0019391

(51) Int. Cl.
*G02B 13/00* (2006.01)
*G02B 27/09* (2006.01)
*G02B 7/09* (2021.01)
*G02B 7/08* (2021.01)

(52) U.S. Cl.
CPC .......... *G02B 13/0065* (2013.01); *G02B 7/08* (2013.01); *G02B 7/09* (2013.01); *G02B 27/0972* (2013.01); *G02B 27/0977* (2013.01)

(58) Field of Classification Search
CPC ........ G02B 13/0065; G02B 7/08; G02B 7/09; G02B 27/0972; G02B 27/0977; G02B 7/182; G02B 13/001; G03B 17/17; G03B 17/12; G03B 30/00
See application file for complete search history.

(56) References Cited

U.S. PATENT DOCUMENTS 10,175,471 B2 * 1/2019 Kumihashi ............ H04N 23/51
10,921,552 B1   2/2021 Park et al.
(Continued)

FOREIGN PATENT DOCUMENTS

KR   10-2018-0041040 A   4/2018
KR     10-1922310 B1    11/2018
(Continued)

OTHER PUBLICATIONS

Korean Office Action dated May 27, 2022, in counterpart Korean Patent Application No. 10-2021-0019391 (7 Pages in English, 5 Pages in Korean).

*Primary Examiner* — Padma Haliyur
(74) *Attorney, Agent, or Firm* — NSIP Law

(57) ABSTRACT

A camera module includes a housing, and a reflective module changing a direction of light incident on the housing. The reflective module includes a first reflective member having a reflective surface, a holder fixedly coupled to the first reflective member, a first magnetic member mounted on the holder, and a second magnetic member mounted in the housing, facing the first reflective member, and spaced apart from the first magnetic member.

20 Claims, 11 Drawing Sheets

(56) References Cited

U.S. PATENT DOCUMENTS

| | | | |
|---|---|---|---|
| 2004/0141065 A1* | 7/2004 | Hara | H04N 23/687 |
| | | | 348/208.11 |
| 2017/0242225 A1 | 8/2017 | Fiske | |
| 2018/0109660 A1 | 4/2018 | Yoon et al. | |
| 2018/0239161 A1* | 8/2018 | Seol | G02B 27/646 |
| 2018/0239162 A1* | 8/2018 | Lee | H04N 5/2328 |
| 2019/0004328 A1* | 1/2019 | Lee | G02B 27/646 |
| 2019/0227406 A1* | 7/2019 | Wang | G02B 7/182 |
| 2019/0235202 A1* | 8/2019 | Smyth | H04N 5/2257 |

FOREIGN PATENT DOCUMENTS

| | | |
|---|---|---|
| KR | 10-2090625 B1 | 3/2020 |
| KR | 10-2020-0101963 A | 8/2020 |
| KR | 10-2145896 B1 | 8/2020 |
| WO | WO 2015/021279 A1 | 2/2015 |
| WO | WO 2019/117652 A1 | 6/2019 |
| WO | WO 2019/148027 A1 | 8/2019 |

* cited by examiner

B-B'

CAMERA MODULE AND STRUCTURE TO SWITCH LIGHT PATH

CROSS-REFERENCE TO RELATED APPLICATIONS

This application claims the benefit under 35 USC 119(a) of Korean Patent Application Nos. 10-2020-0115690 filed on Sep. 9, 2020, and 10-2021-0019391 filed on Feb. 10, 2021, in the Korean Intellectual Property Office, the entire disclosures of which are incorporated herein by reference for all purposes.

BACKGROUND

1. Field

The present disclosure relates to a camera module, and more particularly to, a structure capable of switching a path of light collected by a camera at least once.

2. Description of the Background

Camera modules provided in mobile devices have been manufactured to have levels of performance comparable to those of traditional cameras. In particular, as the frequency of capturing images using mobile devices increases, demand for camera modules capable of providing high zoom magnification has increased.

In order to increase zoom magnification, a distance for light incident in a camera to move to an image sensor, that is, a total track length (TTL), has to be increased, and in order to realize a relatively long total track length, a length of the camera may be increased. Thus, recent camera modules have been provided with a relatively long total track length realized by switching light coming from the rear of a mobile device by about 90 degrees using a reflector such as a prism. However, even in such a camera module including a reflector, in order to further increase zoom magnification, the TTL of the camera is further increased to resultantly increase a length of the camera module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, and a reflective module changing a direction of light incident on the housing, wherein the reflective module includes a first reflective member having a reflective surface, a holder fixedly coupled to the first reflective member, a first magnetic member mounted on the holder, and a second magnetic member mounted in the housing, facing the first reflective member, and spaced apart from the first magnetic member.

The first reflective member may be pulled toward a support wall by magnetic attraction between the first magnetic member and the second magnetic member, and the first reflective member may be supported in a contact portion between the reflective member and the support wall.

The first reflective member and the support wall may face each other in a first direction, the first reflective member may be pulled toward the support wall in the first direction by magnetic attraction between the first magnetic member and the second magnetic member, and the holder may be configured such that a gap exists between the support wall and the holder when the first reflective member is seated on the support wall.

The camera module may further include a lens module including a lens system arranged in an optical axis, wherein the support wall may extend from a bottom surface of the housing to a height corresponding to the first reflective member, and the support wall may be disposed such that a direction in which the reflective surface faces has an angle of 45 degrees with respect to an optical axis of the lens module when the first reflective member is seated on the support wall.

The contact portion may include a contact point, or a contact surface located on both sides of a region in which the magnetic attraction works.

The support wall may include an accommodating recess accommodating a portion of the holder, and the first magnetic member may be mounted in the portion accommodated in the accommodating recess.

The portion of the holder may include a coupling portion protruding in a first direction, the accommodating recess may be depressed in the first direction to accommodate the coupling portion, and the first magnetic member may be mounted in a portion of the coupling portion of the holder facing in the first direction.

The accommodating recess may extend in a second direction substantially perpendicular to the first direction, and the coupling portion may be configured to be fit into the accommodating recess in the second direction.

The accommodating recess may include a limiting portion extending in a third direction substantially perpendicular to the second direction, the coupling portion may include an arresting portion overlapping the limiting portion in the first direction, and movement of the coupling portion in the first direction may be limited by an interference between the arresting portion and the limiting portion in a state in which the coupling portion is accommodated in the accommodating recess.

The holder may include an opening exposing a partial surface of the first reflective member toward the support wall, and the partial surface of the first reflective member exposed through the opening may be in contact with the support wall.

The housing may include a projection protruding toward a surface of the reflective module from a bottom surface thereof, and the reflective module may be partially supported by a contact portion with an end portion of the projection.

The projection may be in contact with the holder accommodated in an accommodating recess of the support wall to support the reflective module.

The camera module may further include an adhesive member filling at least a portion of a gap between the reflective member and the support wall.

The camera module may further include a lens module including a lens system arranged along an optical axis, and a second reflective member reflecting light incident from the outside toward the lens module.

The second reflective member may be configured to change light incident in a first direction into light in a second direction, and the first reflective member may be configured to change light incident in the second direction into light in a direction substantially perpendicular to both the first direction and the second direction.

A portable electronic device may include the camera module, and an image sensor, wherein the image sensor may include a light collecting surface facing the reflective member to generate a digital signal corresponding to light reflected from the reflective member.

In another general aspect, a camera module includes a housing, a lens module accommodated in the housing, a reflective member configured to change a direction of light incident to a front surface to a first direction intersecting an optical axis of the lens module, and provided as a flat plate member, and a support wall provided as a portion of the housing and providing a surface on which the reflective member is seated, wherein the reflective member is pulled toward the support wall by magnetic force, and wherein a portion of a rear surface of the reflective member is in direct contact with the support wall.

In another general aspect, a camera module includes a housing having a support wall, a reflective member disposed in a holder and in direct contact with the support wall, a first magnetic member disposed in the support wall, a second magnetic member disposed in the holder and spaced apart from the first magnetic member, wherein the first magnetic member and the second magnetic member pull the holder to the support wall by magnetic force, and an adhesive member disposed in a gap between the reflective member and the support wall to fix the reflective member to the support wall.

The reflective member may include a reflective surface, and the first magnetic member and the second magnetic member may pull the holder to the support wall by magnetic force in a direction of the reflective surface normal.

The housing may include a projection protruding from a bottom surface of the housing toward the reflective member disposed in the holder, and a bottom surface of the reflective member disposed in the holder may be supported by the projection.

The holder may have a reverse tapered protrusion and the support wall may have a reverse tapered accommodating recess to receive the protrusion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
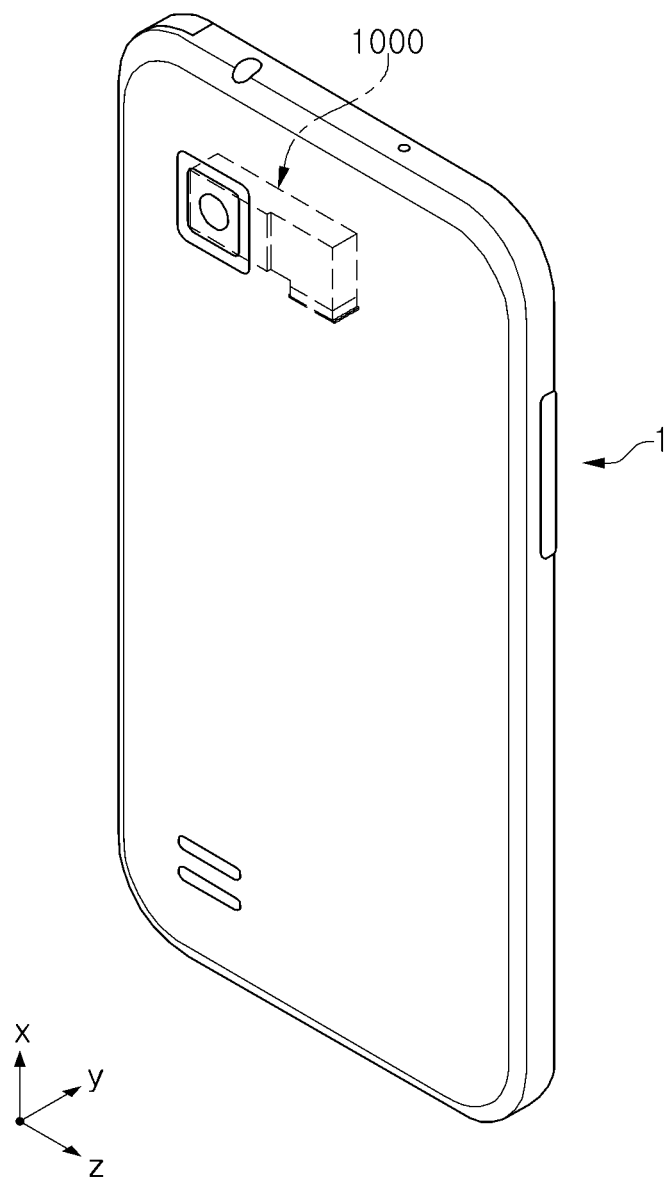
FIG. 1 is a perspective view of a portable electronic device according to a first example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of this disclosure. Further, although the examples described herein have a variety of configurations, other configurations are possible as will be apparent after gaining an understanding of this disclosure.

Example embodiments provide a camera module having high zoom magnification, while minimizing an increase in a length thereof. An aspect of the present disclosure is to implement a long total track length without increasing a length of a camera module excessively.

According to an aspect of the present disclosure, a camera module includes a folded module, a lens module, a reflective module, and an image sensor module provided in a housing. Light incident on the folded module through a portion of the housing may be reflected to the lens module, and light passing through the lens module may be reflected to an image sensor through a mirror lens. Since a light path is changed at least twice by the folded module and the reflective module, a total track length, which is relatively long, may be implemented in the camera module having a limited size.

Figure 2:
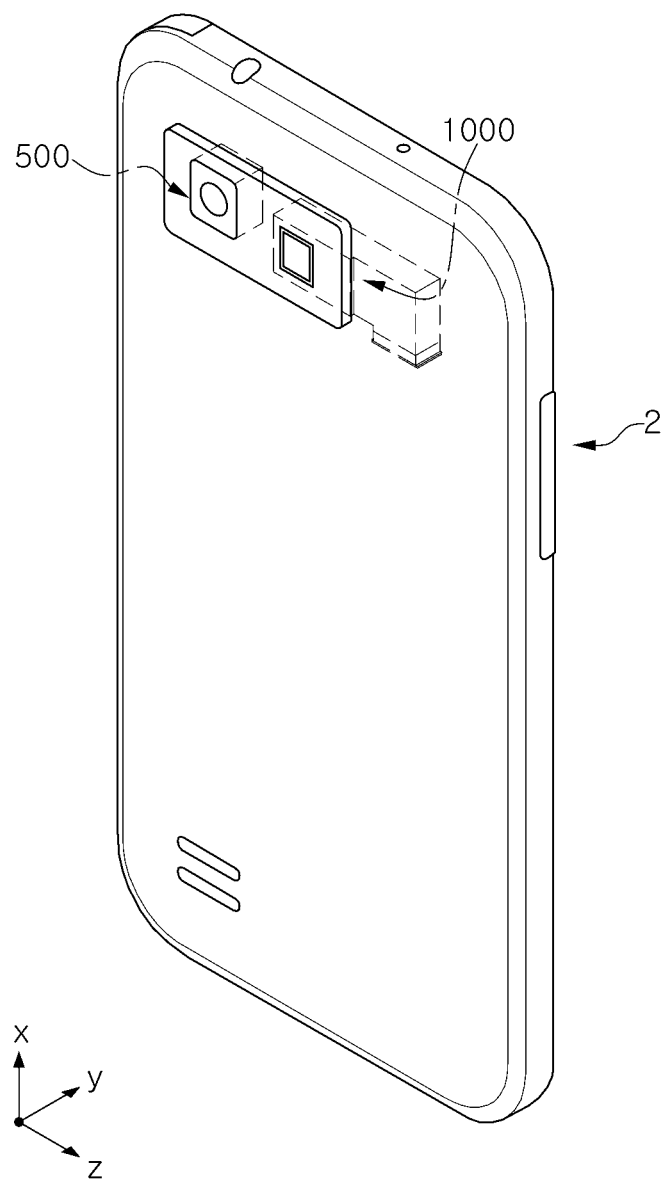
FIG. 2 is a perspective view of a portable electronic device according to a second example embodiment.
Figure 3:
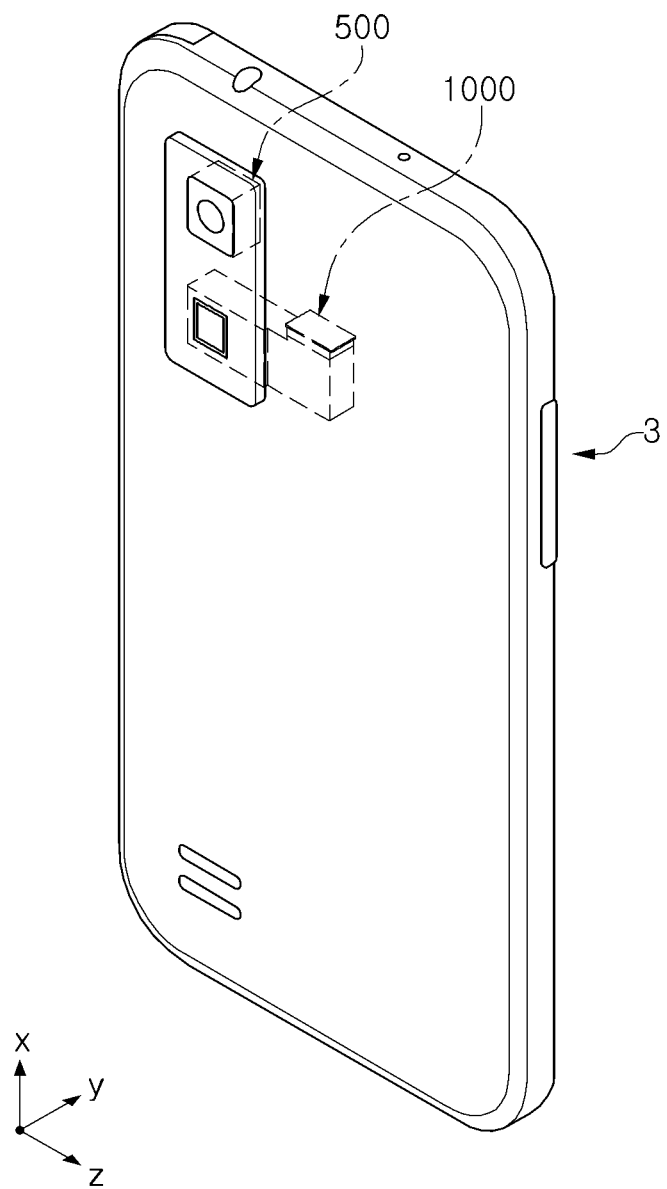
FIG. 3 is a perspective view of a portable electronic device according to a third example embodiment.

FIGS. 1, 2, and 3 are perspective views of a portable electronic device according to an example embodiment.

Referring to FIG. 1, a portable electronic device 1 according to an example embodiment in the present disclosure may be a portable electronic device such as a mobile communication terminal, a smartphone, a tablet PC, and the like equipped with a camera module 1000.

As shown in FIG. 1, the portable electronic device 1 is equipped with a camera module 1000 for imaging a subject.

In this example embodiment, the camera module 1000 may include a plurality of lenses, and an optical axis (Z axis) of the lenses may be disposed in a direction perpendicular to a thickness direction (a Y axis direction, a direction from a front surface to a rear surface of the portable electronic device or the opposite direction) of the portable electronic device 1.

As an example, the optical axis (Z axis) of the lenses provided in the camera module 1000 may be formed in a width direction or a length direction of the portable electronic device 1 (an X axis direction or Z axis direction).

Therefore, even if the camera module 1000 has functions such as autofocusing (AF), a zoom magnification adjustment, and optical image stabilizing (OIS), a thickness of the portable electronic device 1 may not be increased. Accordingly, the portable electronic device 1 may become compact.

The camera module 1000 according to an example embodiment in the present disclosure may include at least one of AF, folded zooming, and OIS functions.

The camera module 1000 having the AF function, the zoom magnification adjustment function, and the OIS function, etc., needs to include various components, and thus, a size of the camera module may increase, as compared to a general camera module.

An increase in the size of the camera module 1000 may hamper miniaturization of the portable electronic device 1 in which the camera module 1000 is mounted.

For example, in a case in which a camera module includes an increased number of stacked lenses for the zoom function and multiple stacked lenses are formed in a thickness direction of a portable electronic device, a thickness of the portable electronic device may increase according to the number of stacked lenses. Accordingly, without increasing the thickness of the portable electronic device, a sufficient number of stacked lenses may not be secure, which may weaken zoom performance.

In addition, in order to implement the AF and OIS functions, it is necessary to install an actuator moving a lens system in a direction of the optical axis direction or in a direction perpendicular to the optical axis, and here, in a case in which the optical axis of the lens system is formed in the thickness direction of the portable electronic device, the actuator for moving the lens system also has to be installed in the thickness direction of the portable electronic device. Accordingly, a thickness of the portable electronic device is increased.

However, since the camera module 1000 according to an example embodiment in the present disclosure is disposed so that the optical axes (Z-axis) of the plurality of lenses are perpendicular to the thickness direction of the portable electronic device 1, the portable electronic device 1 may become compact, even with the camera module 1000 including the autofocusing function, the zoom magnification adjustment function, and the OIS function mounted therein.

As shown in FIGS. 2 and 3, two or more camera modules may be mounted in the portable electronic device 2 or 3 to image a subject. For example, the portable electronic device may further include a second camera module 500 together with the first camera module 1000 described in FIG. 1.

Both the electronic devices 2 and 3 of FIGS. 2 and 3 include two camera modules, and FIG. 2 illustrates a case in which the first camera module 1000 and the second camera module 500 are sequentially arranged in a width direction (relatively short side direction) of the portable electronic device 2, and FIG. 3 illustrates a case in which the first camera module 1000 and the second camera module 500 are sequentially arranged in a length direction (relatively long side direction) of the portable electronic device 3.

In the case of using two camera modules, entrance ports through which light is incident on the two camera modules may be arranged as close to each other as possible.

The first camera module 1000 and the second camera module 500 may be configured to have different angles of view. The first camera module 1000 may be configured with a relatively narrow angle of view (e.g., a telephoto camera), and the second camera module 500 may be configured to have a relatively wide angle of view (e.g., a wide-angle camera). Here, the first camera module 1000 may correspond to a camera module described below with reference to FIGS. 4 to 12.

Figure 4:
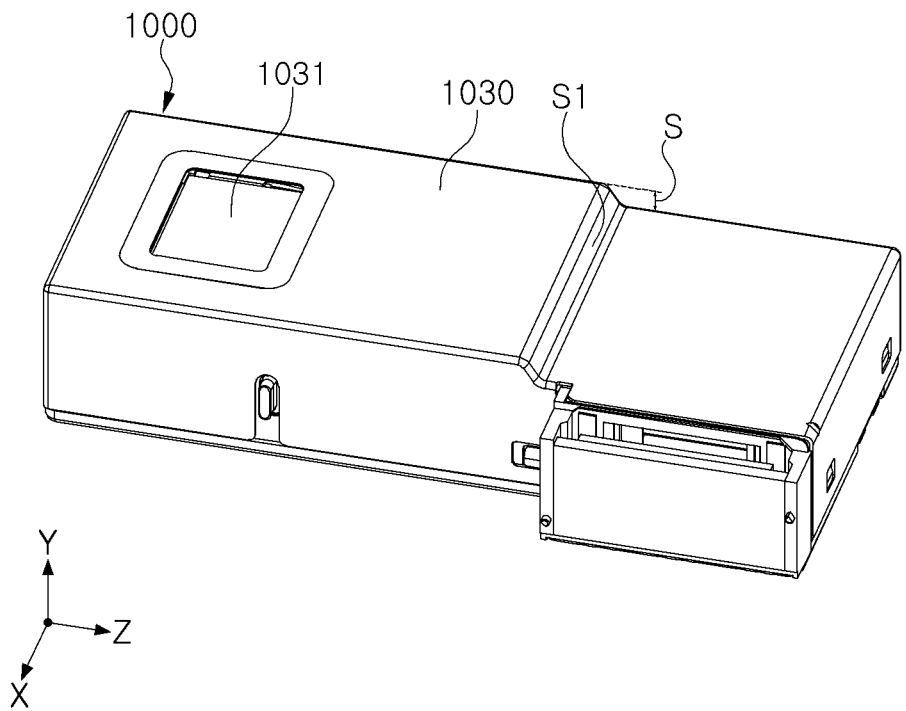
FIG. 4 is a perspective view of a camera module according to an example embodiment.
Figure 5:
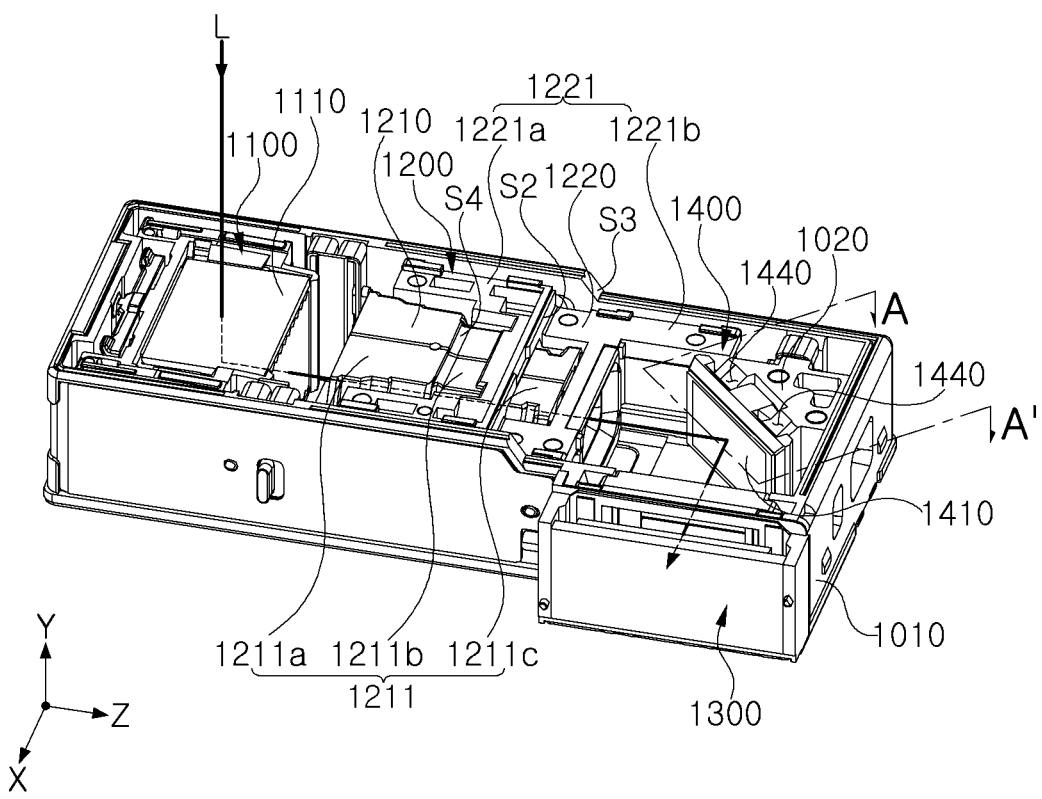
FIG. 5 is a perspective view of an internal structure of a camera module according to an example embodiment.
Figure 6:
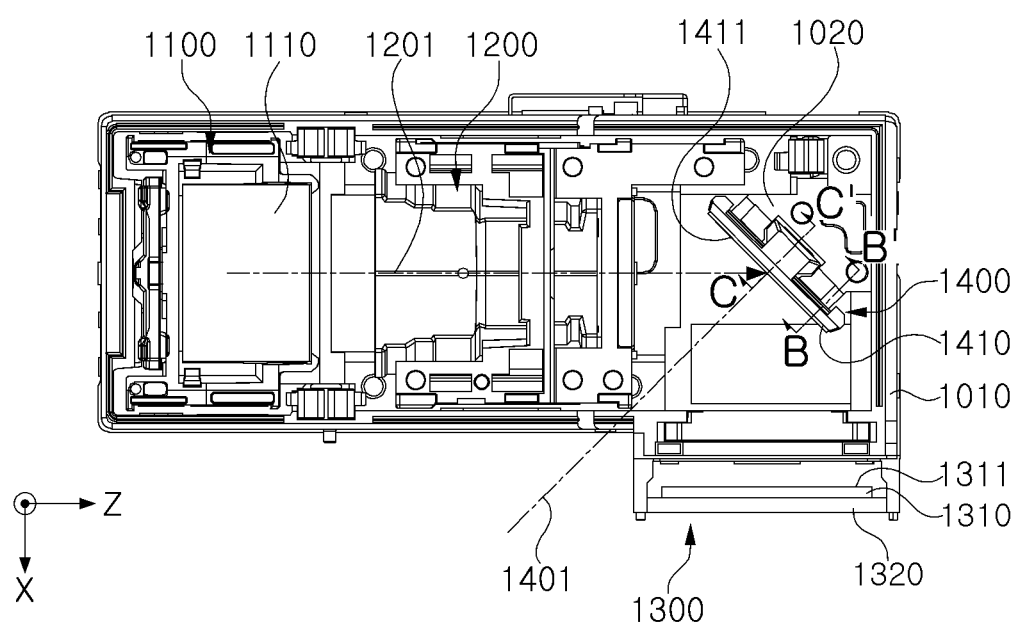
FIG. 6 is a plan view of an internal structure of a camera module according to an example embodiment.

FIG. 4 is a perspective view of a camera module in an example embodiment. FIG. 5 is a perspective view of an internal structure of a camera module according to an example embodiment. FIG. 6 is a plan view of an internal structure of a camera module according to an example embodiment.

Referring to FIGS. 4 to 6, in an example embodiment, a camera module includes a folded module 1100, a lens module 1200, and an image sensor module 1300 provided in a housing (or frame).

The folded module 1100 is configured to change a direction of travel of light. For example, light incident through an opening 1031 (refer to FIG. 4) of a cover 1030 covering an upper portion of the camera module 1000 may be changed in direction of travel toward the lens module 1200 (or an image sensor 1310 provided in the image sensor module 1300) through the folded module 1100. To this end, the folded module 1100 may include a second reflective member 1110 reflecting light.

A path of light incident through the opening 1031 is changed toward the lens module 1200 by the folded module 1100. For example, the path of light incident in the thickness direction (the Y-axis direction) of the camera module 1000 may be changed by the folded module 1100 to substantially coincide with the optical axis (Z-axis) direction.

In an example embodiment, the lens module 1200 may include a plurality of lenses. Light reflected from the folded module 1100 may be refracted, while passing through the plurality of lenses. Referring to FIG. 6, in an example embodiment, a plurality of lenses provided in the lens module 1200 may be aligned along the optical axis 1201.

In an example embodiment, the lens module 1200 may include a lens barrel 1210 including a plurality of lenses and a lens holder 1220 accommodating the lens barrel 1210. In an example embodiment, the lens barrel 1210 and the lens holder 1220 may be integrally formed or may be formed as separate components and then combined with each other in another example embodiment.

In an example embodiment, the camera module 1000 may include a first reflective member 1410 reflecting light passing through the lens module 1200 toward the image sensor 1310.

In an example embodiment, any member capable of reflecting light may be used as the first reflective member 1410. For example, a mirror, a prism, a splitter, or the like may be used as the first reflective member 1410.

In an example embodiment, the first reflective member 1410 may be supported by a support wall 1020 provided in a housing 1010. For example, a portion of the first reflective member 1410 may be seated on a surface of the support wall 1020. In an example embodiment, the support wall 1020 supporting the first reflective member 1410 may be configured to reflect light passing through the lens module 1200 when the first reflective member 1410 is assembled in the housing 1010 (or the support wall 1020).

In an example embodiment, the support wall 1020 may be provided as a portion of the housing 1010. For example, the support wall 1020 may extend from a bottom surface 1011 of the housing 1010 to a height corresponding to the first reflective member 1410. In an example embodiment, the support wall 1020 may be configured such that a direction in which a reflective surface faces has an angle of 45 degrees with respect to the optical axis 1201 of the lens module 1200 when the first reflective member 1410 is seated on the support wall 1020. For example, the support wall 1020 includes a seating surface 1021*a* facing a direction intersecting the optical axis 1201 at an angle of 45 degrees, and a first reflective member 1410 having a flat plate shape may be seated on the seating surface 1021*a*. In this case, light passing through the lens module 1200 may be incident on the reflective surface 1411 of the first reflective member 1410 at an angle of 45 degrees, and a direction of travel of light may be bent at an angle of 90 degrees or an angle close to 90 degrees.

Figure 7:
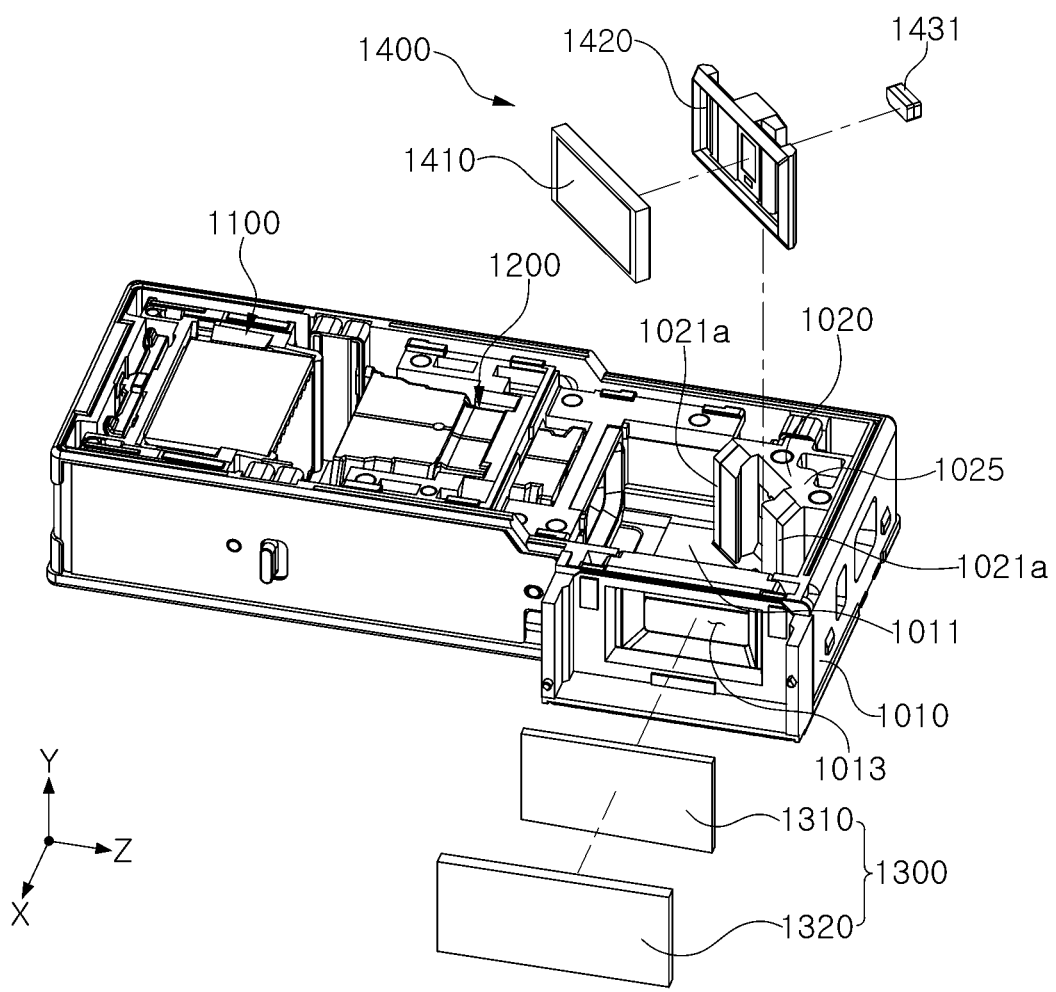
FIG. 7 is an exploded perspective view of a camera module according to an example embodiment.
Figure 8:
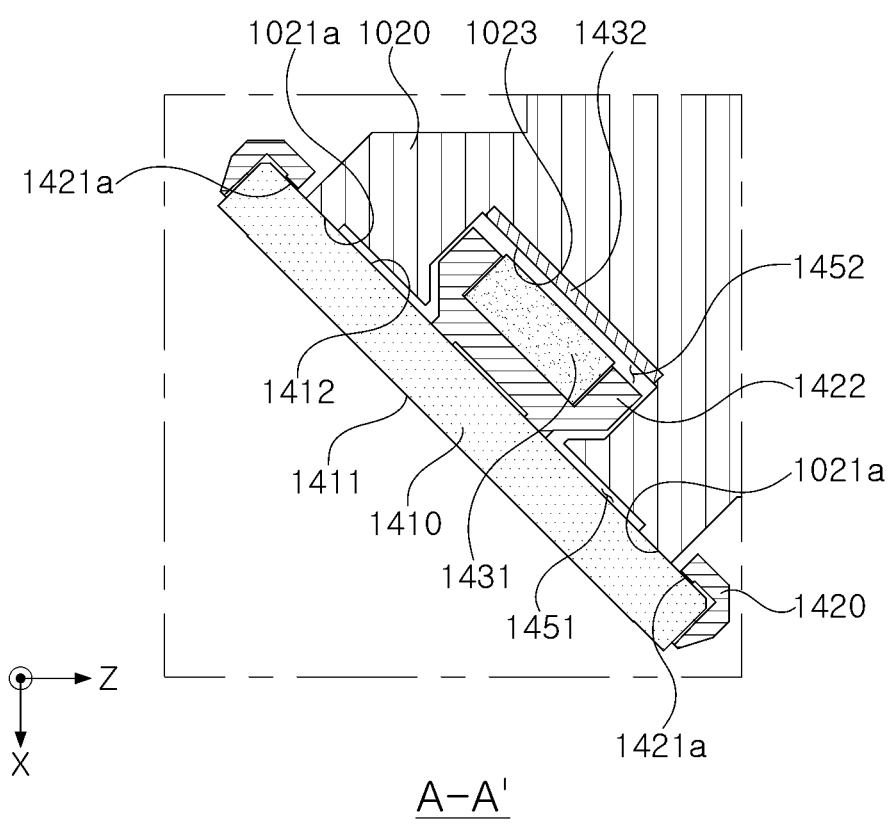
FIG. 8 illustrates a method in which a reflective module is coupled to a support wall in an example embodiment.

Referring to FIGS. 7 and 8, for example, the support wall 1020 may include the seating surface 1021*a* forming an angle of 45 degrees with respect to the X-axis and Z-axis (or the optical axis) when viewed in the Y-axis direction. In an example embodiment, when the first reflective member 1410 in the form of a flat plate is seated on the seating surface 1021*a*, the reflective surface 1411 of the first reflecting member 1410 is also parallel to the Y-axis like the seating surface 1021*a* and may have an angle of 45 degrees with respect to both the X and Z axes.

In an example embodiment, the image sensor module 1300 includes an image sensor 1310 and a substrate 1320 on which the image sensor 1310 is mounted. The image sensor 1310 may be disposed so that a light collecting surface of the sensor faces the reflective member, and may generate a digital signal corresponding to light reflected from the reflective member.

In an example embodiment, the image sensor module 1300 may include an optical filter that filters light incident from the lens module 1200. The optical filter may include an infrared cut filter.

In an example embodiment, the housing 1010 may include a through portion 1013 opened toward the image sensor 1310 on a side surface of the housing 1010 so that the housing 1010 does not interfere with light reflected from the reflective module 1400 while reaching the image sensor 1310.

In an example embodiment, the housing 1010 may have an internal space configured to accommodate the folded module 1100, the lens module 1200, and the image sensor module 1300. In an example embodiment, a portion of the image sensor module 1300 may be provided outside the housing. For example, the substrate 1320 of the image sensor module 1300 may be attached to the outside of the housing 1010. An electronic component (e.g., a coil or a position sensor) mounted on the substrate 1320 may interact with the folded module 1100 or lens module 1200 provided in an internal space of the housing 1010 through the through portion provided in the housing 1010.

In an example embodiment, the housing 1010 may be integrally provided to accommodate all of the folded module 1100, the lens module 1200, and the image sensor module 1300 in the internal space. However, the present disclosure is not limited thereto, and in another example embodiment, the housing 1010 may have a structure in which housings configured to accommodate some of the folded module 1100, the lens module 1200, and the image sensor module 1300 are interconnected.

In the illustrated example embodiment, the image sensor module 1300 is provided in the housing 1010, but in another example embodiment, a separate housing configured to accommodate the image sensor module 1300 may be connected to the housing 1010 accommodating the folded module 1100 and the lens module 1200.

In an example embodiment, the housing 1010 is covered by a cover 1030 so that the internal space is not visible. The cover 1030 has an opening 1031 so that light is incident therein, and light incident through the opening 1031 is changed in a direction of travel by the folded module 1100 to enter the lens module 1200. The cover 1030 may be integrally provided to cover the entire housing 1010 or may be divided into separate members covering the folded module 1100 and the lens module 1200, respectively.

According to an example embodiment in the present disclosure, light incident on the folded module 1100 through a portion of the housing 1010 is reflected to the lens module 1200, and light passing through the lens module 1200 may be reflected to the image sensor 1310 through the first reflective member 1410. For high zoom magnification, a long track length has to be secured. In this case, in a camera module equipped with only the folded module 1100, a distance between the folded module 1100 and the image sensor 1310 increases, and thus, such a camera module is not suitable to be employed in mobile devices with an insufficient internal space.

In the camera module according to example embodiments of the present disclosure, an optical path may be changed at least two times by the folded module 1100 and the reflective module 1400. Referring to FIG. 6, a path of light passing through the lens module 1200 may be changed by about 90 degrees by the reflective module 1400 before entering the image sensor module 1300.

Referring to FIG. 5, light L incident on the folded module 1100 in the Y-axis direction may be changed to the Z-axis direction by the second reflective member 1110, and after passing through the lens module 1200, light L may be changed to the X-axis direction by the first reflective member 1410. According to example embodiments of the present disclosure, the camera module 1000 having a relatively long track length may be provided without excessively increasing the length of the camera module 1000 in the Z-axis direction.

Meanwhile, the reflective module 1400 described in the present disclosure may be employed in various devices as a structure for reflecting light, and application thereof is not limited to the camera module 1000 of the illustrated type. For example, light entering the electronic device through a partial surface of the electronic device may reach the image sensor after being reflected at least once, and in this case, the reflective module 1400 of the present disclosure may be provided as a structure reflecting light in the electronic device.

Meanwhile, in the illustrated example embodiment, a direction in which light passing through the reflective module 1400 is bent is a +X direction, but the example embodiment in the present disclosure is not limited thereto, and in another example embodiment, light may be bent by the reflective module 1400 in various directions. For example, the direction in which light passing through the reflective module 1400 is bent may be a −X direction, and in this case, the image sensor module 1300 may be provided in the −X direction of the reflective module 1400.

In an example embodiment, the camera module 1000 may include a step portion S having a reduced thickness in a middle portion. As the thickness of the camera module 1000 increases, a portion of a rear surface of the portable electronic device in which the camera module 1000 is located may protrude, relative to other portions. For the appearance or usability of the electronic device, it is preferable that the rear surface is flat, but in a case in which a protruding portion is inevitably provided on the rear surface due to the camera module 1000, it may be advantageous to minimize an area of the protruding portion to improve usability or appearance. In an example embodiment, since the camera module 1000 has a step portion, a thickness of a portion of the camera module 1000 is reduced, so that the appearance and usability of the portable electronic device may be improved.

Referring to FIG. 4, in an example embodiment, one side of the camera module 1000 may have a height different from that of the other side thereof based on a boundary substantially parallel to the X-axis. In an example embodiment, the camera module 1000 may include a step portion S in a direction parallel to the optical axis 1201 (the Z-axis direction in the drawing). The step portion S may be located approximately in the middle of the camera module 1000. For example, the step portion S may be provided at a point of ⅓ to ⅔ of a length of the camera module 1000 in the direction of the optical axis 1201.

In order to implement the step portion S, the housing 1010, the cover 1030, the lens module 1200—the lens holder 1220 and/or the lens barrel 1210—may all be provided with a step. In an example embodiment, the cover 1030 may have a first step S1 corresponding to the step portion S.

In an example embodiment, the step portion S may be provided to overlap a position in which the lens module 1200 is provided. For example, in a plan view of the camera module 1000, the step portion S may be located in a region occupied by the lens module 1200.

Referring to FIG. 5, in an example embodiment, the lens module 1200 may include a second step S2 corresponding to the step portion S. When the lens module 1200 includes a lens holder 1220 provided separately from the lens barrel 1210, the lens holder 1220 may include a second step S2 corresponding to the step portion S. For example, an upper surface 1221 of the lens holder 1220 may be divided into a first surface 1221a and a second surface 1221b having a height lower than that of the first surface 1221a based on the second step S2.

In an example embodiment, the housing 1010 may include a third step S3 corresponding to the step portion S. For example, a side wall constituting the housing 1010 may have a different height from the third step S3.

In an example embodiment, the lens barrel 1210 may also include a step corresponding to the step portion S. For example, an upper surface 1211 of the lens barrel 1210 may include portions 1211a, 1211b, and 1211c having different heights, and a fourth step S4 may be formed therebetween. In addition, at least some of the lenses inserted into the lens barrel 1210 may be D-cut lenses—lenses having a shape in which an edge is cut out from a round shape.

Figure 9:
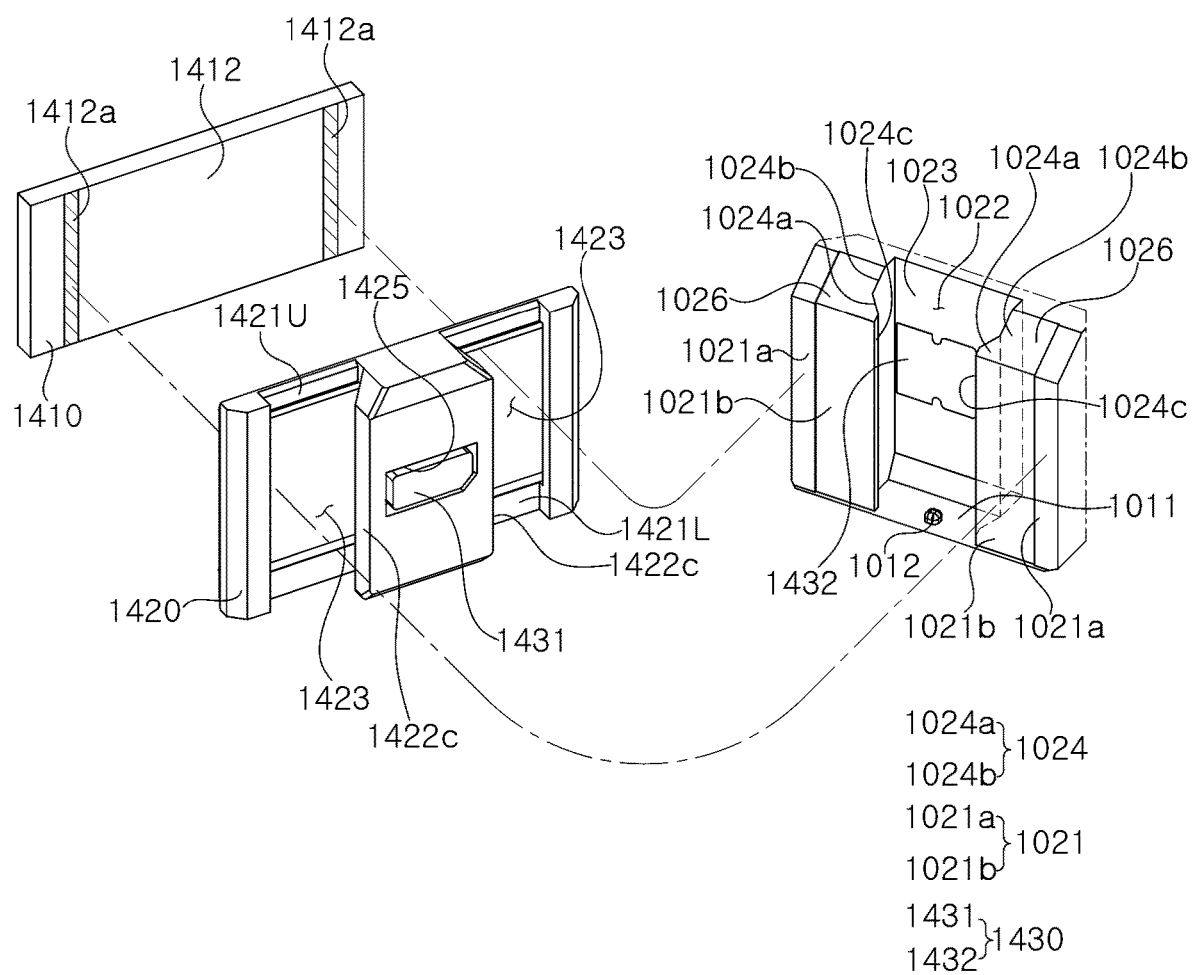
FIG. 9 is an exploded view showing a method of coupling a reflective module to a support wall according to an example embodiment.
Figure 10:
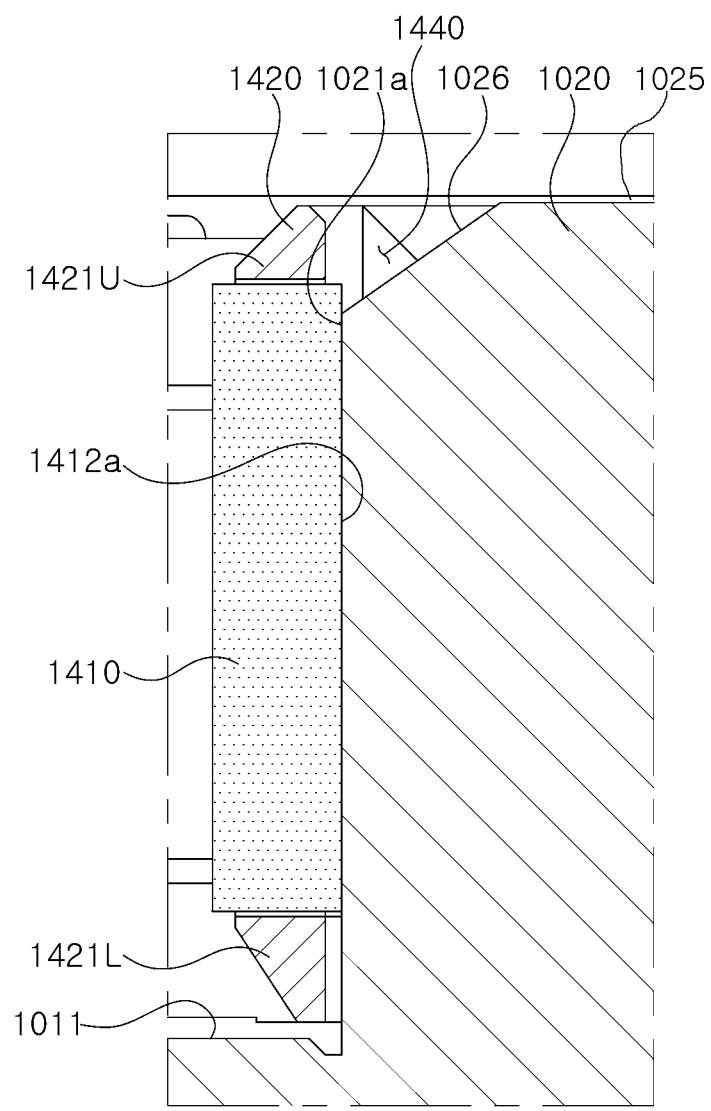
FIG. 10 illustrates a method in which a reflective module is supported by a support wall in an example embodiment.

FIG. 7 is an exploded perspective view of a camera module according to an example embodiment. FIG. 8 illustrates a method in which a reflective module is coupled to a support wall in an example embodiment. FIG. 8 is a cross-sectional view taken along line A-A' of FIG. 5. FIG. 9 is an exploded view showing a method of coupling a reflective module and a support wall according to an example embodiment. FIG. 10 illustrates a method in which a reflective module is supported by a support wall in an example embodiment. FIG. 10 is a cross-sectional view taken along line B-B' of FIG. 6.

Referring to FIGS. 7 to 10, in an example embodiment, the reflective module 1400 may include a first reflective member 1410 and a holder 1420 coupled to the first reflective member 1410.

In an example embodiment, the first reflective member 1410 may be disposed such that a direction in which the reflective surface 1411 faces (i.e., a direction of a normal 1401 of the reflective surface 1411) is oblique to the optical axis 1201. In an example embodiment, light passing through the lens module 1200 may be incident at a non-zero incident angle (an angle between the normal 1401 of the reflective surface 1411 and the incident light) on the reflective surface 1411 of the first reflective member 1410.

In an example embodiment, the image sensor module may be disposed in a position which light reflected by the first reflective member 1410 reaches. In an example embodiment, the image sensor 1310 may be disposed such that a surface 1311 (hereinafter, referred to as a "sensor surface 1311") collecting light views light passing through the lens module 1200 via the first reflective member 1410.

In the example embodiments shown in the drawings of the present disclosure, the reflective module 1400 is configured to bend light passing through the lens module 1200 toward the image sensor 1310, but the example embodiment in the present disclosure is not limited thereto. That is, the reflective module 1400 described in the present disclosure may be provided in various types of camera modules and may function as an element that changes a direction of light, and a position thereof is not limited to the example embodiments shown in the drawings of the present disclosure. For example, the reflective module 1400 may be disposed in a direction toward an object side of the lens module 1200.

In an example embodiment, the first reflective member 1410 may be disposed in the housing 1010 so that the normal 1401 of the reflective surface 1411 forms an angle of approximately 45 degrees with respect to the optical axis 1201 of the lens module 1200. Here, light passing through the lens module 1200 may be reflected by the first reflective member 1410 and may be changed in a direction of travel by approximately 90 degrees.

In an example embodiment, the image sensor 1310 may be disposed such that the sensor surface 1311 faces a direction perpendicular or substantially perpendicular to the optical axis 1201. In an example embodiment, a surface perpendicular to the optical axis 1201, the reflective surface 1411 of the first reflective member 1410, and the sensor surface 1311 may all be parallel to the Y-axis.

In an example embodiment, the holder 1420 may include a base 1421 (FIG. 11) to which the first reflective member 1410 is attached. In an example embodiment, the first reflective member 1410 may be provided on a surface of the base 1421. In an example embodiment, the base 1421 may include a seating surface 1421*a* facing the front of the base 1421, and a rear surface 1412 of the first reflective member 1410 may be attached to the seating surface 1421*a*.

In the present disclosure, the front of the first reflective member 1410 or the front of the base 1421 is defined as a direction in which the reflective surface 1411 faces, and the rear of the first reflective member 1410 or the rear of the base 1421 may be defined as a direction in which the rear surface 1412 of the first reflective member 1410 faces.

In an example embodiment, the base 1421 may include a through portion 1423. When the first reflective member 1410 is attached to the seating surface 1421*a* of the base 1421, the rear surface 1412 of the first reflective member 1410 may be partially exposed through the through portion 1423. In an example embodiment, the rear surface 1412 partially exposed to the rear of the base 1421 through the through portion 1423 may contact a portion of the support wall 1020.

In an example embodiment, the holder 1420 may further include a coupling portion 1422 configured to mount the reflective module 1400 on the support wall 1020. In an example embodiment, the base 1421 and the coupling portion 1422 may be integrally formed. In another example embodiment, the base 1421 and the coupling portion 1422 may be formed as separate components and may then be coupled to each other.

In an example embodiment, the reflective module 1400 may be provided on the support wall 1020. In an example embodiment, the support wall 1020 may be integrally formed with the housing 1010 or may be formed as a separate component from the housing 1010 and then coupled to the housing 1010.

In an example embodiment, the reflective module 1400 may be attached to the support wall 1020 by magnetic force. In an example embodiment, the reflective module 1400 and the support wall 1020 may include magnetic members 1430 facing each other. The magnetic member may include a magnet or yoke. The first reflective member 1410 may be pulled toward the support wall 1020 by magnetic attraction between a first magnetic member 1431 and a second magnetic member 1432.

In an example embodiment, the first magnetic member 1431 may be provided in the coupling portion 1422 of the holder 1420, and the second magnetic member 1432 facing the first magnetic member 1431 may be provided in the support wall.

In an example embodiment, the first magnetic member 1431 may be a magnet, and the second magnetic member 1432 may be a yoke. In another example embodiment, the first magnetic member 1431 may be a yoke, and the second magnetic member 1432 may be a magnet. In another example embodiment, both the first magnetic member 1431 and the second magnetic member 1432 may be magnets.

In an example embodiment, the holder 1420 may include a recess 1425 for accommodating the first magnetic member 1431. In an example embodiment, the second magnetic member 1432 may be provided in a state of being embedded in the housing 1010. A portion of the second magnetic member 1432 may be exposed externally of the housing 1010 so as to face the first magnetic member 1431.

In an example embodiment, the camera module 100 may include a reinforcing plate to supplement rigidity of the housing 1010. The reinforcing plate may be partially embedded in the housing 1010, and a portion of the reinforcing plate may be provided as the second magnetic member 1432.

In an example embodiment, the second magnetic member 1432 may be formed separately from or integrally with the housing 1010. For example, when the second magnetic member 1432 is integrally formed, the yoke may be integrally manufactured with the housing 1010 in a double injection method.

In an example embodiment, the first magnetic member 1431 and the second magnetic member 1432 are facing away from each other. For example, an air gap may exist between the first magnetic member 1431 and the second magnetic member 1432. The first magnetic member 1431 and the second magnetic member 1432 merely provide magnetic attraction between the reflective module 1400 and the support wall 1020 and do not directly contact each other. An air gap 1452 may exist between the first magnetic member 1431 and the second magnetic member 1432.

In an example embodiment, when the reflective module 1400 is attached to the support wall 1020, the first reflective member 1410 may be directly supported by the support wall 1020. The housing 1010 may directly support the first reflective member 1410 without a separate component between the first reflective member 1410 and the housing 1010 (or the support wall 1020). In an example embodiment, a support point (or support surface) supporting the reflective module 1400 in a direction perpendicular to the reflective surface 1411 may be formed between the rear surface 1412 of the first reflective member 1410 and the support wall 1020.

In an example embodiment, the first reflective member 1410 may be provided in a flat plate shape. A direction of light incident on the reflective surface 1411 of the first reflective member 1410 is changed into a first direction (e.g., the X-axis direction) intersecting the optical axis 1201 of the lens module 1200. The rear surface 1412 of the first reflective member 1410 may be parallel to the reflective surface 1411, and a portion 1412a of the rear surface 1412 of the first reflective member 1410 may directly contact the support wall 1020. For example, no other components are interposed between the rear surface 1412 of the first reflective member 1410 and the seating surface 1021a of the support wall 1020.

In an example embodiment, the first reflective member 1410 contacts the support wall 1020, and a contact portion is formed between the first reflective member 1410 and the support wall 1020. The contact portion may include a contact point and/or a contact surface. For example, referring to FIG. 9, as the portion 1412a of the rear surface 1412 of the first reflective member 1410 is in contact with the seating surface 1021a of the support wall 1020, a contact portion may be formed between the reflective member 1410 and the support wall 1020.

In an example embodiment, the contact portion may include a contact point and/or a contact surface located on both sides of a region in which magnetic attraction works. For example, contact portions may be formed on the left and right sides of the first magnetic member 1431 or the second magnetic member 1432. Referring to FIG. 9, the contact portions may be provided on the rear surface 1412 of the first reflective member 1410 in the form of two parallel strips positioned on both sides of the first magnetic member 1431.

Due to the magnetic members 1431 and 1432, the first reflective member 1410 is pulled in a direction toward the support wall 1020, and the first reflective member 1410 is supported by the contact portion. For example, when magnetic attraction pulls the first reflective member 1410 in the first direction, the support wall 1020 provides a reaction force from the contact portion to the first reflective member 1410 in a direction opposite to the first direction.

In an example embodiment, the support wall 1020 may be configured not to directly support the holder 1420 accommodating the first reflective member 1410. That is, when the reflective module 1400 is pulled toward the support wall 1020 by magnetic attraction, the reaction force applied by the support wall 1020 to the reflective module 1400 may only act through the first reflection member 1410. In an example embodiment, the holder 1420 may be configured such that an air gap exists between the support wall 1020 and the holder 1420 when the first reflective member 1410 is seated on the support wall 1020. For example, an air gap may exist between the base 1421 and the seating surface 1021a. In addition, an air gap 1452 may exist between the coupling portion 1422 of the holder 1420 and a bottom surface 1023 of an accommodating recess 1022.

The first reflective member 1410 has to be installed in the housing 1010 to have an accurate angle with respect to the lens module 1200. This is because if the angle of the first reflective member 1410 deviates from a designed angle, light passing through the lens module may not normally reach the image sensor 1310, which may result in a deterioration in image quality. However, due to manufacturing tolerance of each of the reflective module 1400 and the housing 1010 and assembly tolerance therebetween, it may be difficult to install the first reflective member 1410 to have an accurate angle with respect to the lens module 1200 or the image sensor 1310 in the housing 1010.

Accordingly, in the present example embodiment, in order to minimize assembly tolerance with other members in the process of installing the first reflective member 1410 in the housing 1010, the first reflective member 1410 may be directly supported by the housing 1010 (or the support wall 1020).

In an example embodiment, since the first reflective member 1410 is directly supported on the housing 1010, a quality of assembling the first reflective member 1410 with respect to the housing 1010 may be improved. Since the first reflective member 1410 has a relatively high flatness and a portion of the first reflective member 1410 is attached to the seating surface 1021a, it may be easy to assemble the first reflective member 1410 to the housing 1010 such that the reflective surface 1411 has a designated angle with respect to the optical axis 1201.

In an example embodiment, at least a portion of the rear surface 1412 of the first reflective member 1410 exposed to the rear of the base 1421 through the through portion 1423 of the base 1421 may be in contact with the seating surface 1021a of the support wall 1020.

In an example embodiment, the support wall 1020 may include a wall surface 1021 facing the reflective module 1400. The seating surface 1021a may be a portion of the wall surface 1021. Since the seating surface 1021a, as a portion of the wall surface 1021, is in direct contact with the rear surface 1412 of the first reflective member 1410, the first reflective member 1410 may be supported. In the present disclosure, direct contact of the rear surface 1412 of the first reflective member 1410 with the seating surface 1021a of the support wall 1020 means that there are no other components between the rear surface 1412 of the first reflective member 1410 and the seating surface 1021a of the support wall 1020.

In an example embodiment, a portion 1021b of the wall surface 1021, excluding the seating surface 1021a, may be lower than the seating surface 1021a, and thus may not contact the rear surface 1412 of the first reflective member 1410. An air gap 1451 may exist between the portion 1021b of the wall surface 1021, excluding the seating surface 1021a, and the rear surface 1412 of the first reflective member 1410. In an example embodiment, since a portion (e.g., the seating surface 1021a), rather than the entirety of the wall surface 1021, supports the first reflective member 1410, a portion in which assembly tolerance may occur between the first reflective member 1410 and the support wall 1020 may be minimized. That is, by minimizing an area in which the reflective member 1420 contacts the support wall 1020, a portion in which assembly tolerance may occur therebetween may be minimized.

In an example embodiment, the support wall 1020 may include two or more divided support surfaces 1021a. For example, the support wall 1020 may have seating surfaces 1021a on both sides of the accommodating recess 1022. In an example embodiment, the seating surface 1021a may have a predetermined width and may extend in a height direction (Y-axis direction) of the first reflective member 1410.

In an example embodiment, the seating surface 1021a may face an upper frame 1421U or a lower frame 1421L of the base 1421, but the seating surface 1021a may be in contact with only the rear surface 1412 of the first reflective member 1410 and may not contact the base 1421. In an example embodiment, the rear surface 1412 of the first reflective member 1410 may be farther to the rear of the base 1421 than the upper frame 1421U or the lower frame 1421L of the base 1421. Therefore, even if the seating surface 1021a is in contact with the rear surface 1412 of the first reflective member 1410, respective air gaps may exist between the seating surface 1021a and the upper and lower frames 1421U and 1421L of the base 1421.

In an example embodiment, the reflective module 1400 may be attached to the support wall 1020 by magnetic attraction between the magnetic members 1430 provided in the support wall 1020 and the reflective module 1400, respectively. As described above, the magnetic members 1430 merely provide magnetic attraction between the reflective module 1400 and the support wall 1020 and do not contact each other. As a result, when the magnetic attraction between the magnetic members 1430 pulls the reflective module 1400 toward the support wall 1020, the seating surface 1021a of the support wall 1020 may come into contact with the rear surface of the first reflective member 1410, thereby supporting the reflective module 1400.

In the illustrated example embodiment, the shape of the seating surface 1021a is merely an example. In other example embodiments, the seating surface 1021a may have various shapes. For example, the seating surface 1021a may have a width smaller than the illustrated seating surface 1021a.

In the illustrated example embodiment, the seating surface 1021a portion and other portions of the support wall 1020 (e.g., the portion 1021b of the wall surface 1021) may be formed of a single material. In another example embodiment, the seating surface 1021a portion may be formed of a material different from the other portions. For example, the support wall 1020 may include a metal portion formed by a double injection method, and a portion of the metal portion may form the seating surface 1021a.

In the example embodiment shown in the present disclosure, the first reflective member 1410 is in direct surface contact with the housing 1010. However, the present disclosure is not limited to the surface contact between the first reflective member 1410 and the housing 1010. In another example embodiment, the first reflective member 1410 may be in point contact with the housing 1010. For example, the support wall 1020 may include projections protruding from the wall surface 1021 toward the rear surface 1412 of the first reflective member 1410, and the projections may be in contact with the rear surface 1412 of the first reflective member 1410. When the support wall 1020 includes three projections, the first reflective member 1410 may be supported at three points by the projections.

In another example embodiment, the first reflective member 1410 may make surface contact and point contact with the housing 1010. For example, one side of the first reflective member 1410 may be in surface contact with the seating surface 1021a of the support wall 1020 and the other side thereof may be in point contact with the projection of the support wall 1020.

In an example embodiment, the support wall 1020 may include an inclined surface 1026 (or chamfered surface) between the upper surface 1025 and the wall surface 1021.

In an example embodiment, the camera module 100 may further include an adhesive member filling at least a portion of a gap between the support wall 1020 and the reflective module 1400. In an example embodiment, when the reflective module 1400 is attached to the support wall 1020, an adhesive member may be provided between the support wall 1020 and the reflective module 1400. The adhesive member may fix and couple the reflective module 1400 to the support wall 1020. Here, an adhesive member is not disposed between the rear surface 1412 of the first reflective member 1410 and the seating surface 1021a. For example, in an example embodiment, referring to FIGS. 5 and 10, an adhesive member may be applied to a space 1440 between the support wall 1020 and the reflective module 1400. In an example embodiment, an adhesive member may be applied to the space 1440 between the inclined surface 1026 of the support wall 1020 and the first reflective member 1410 or the holder 1420.

Figure 11:
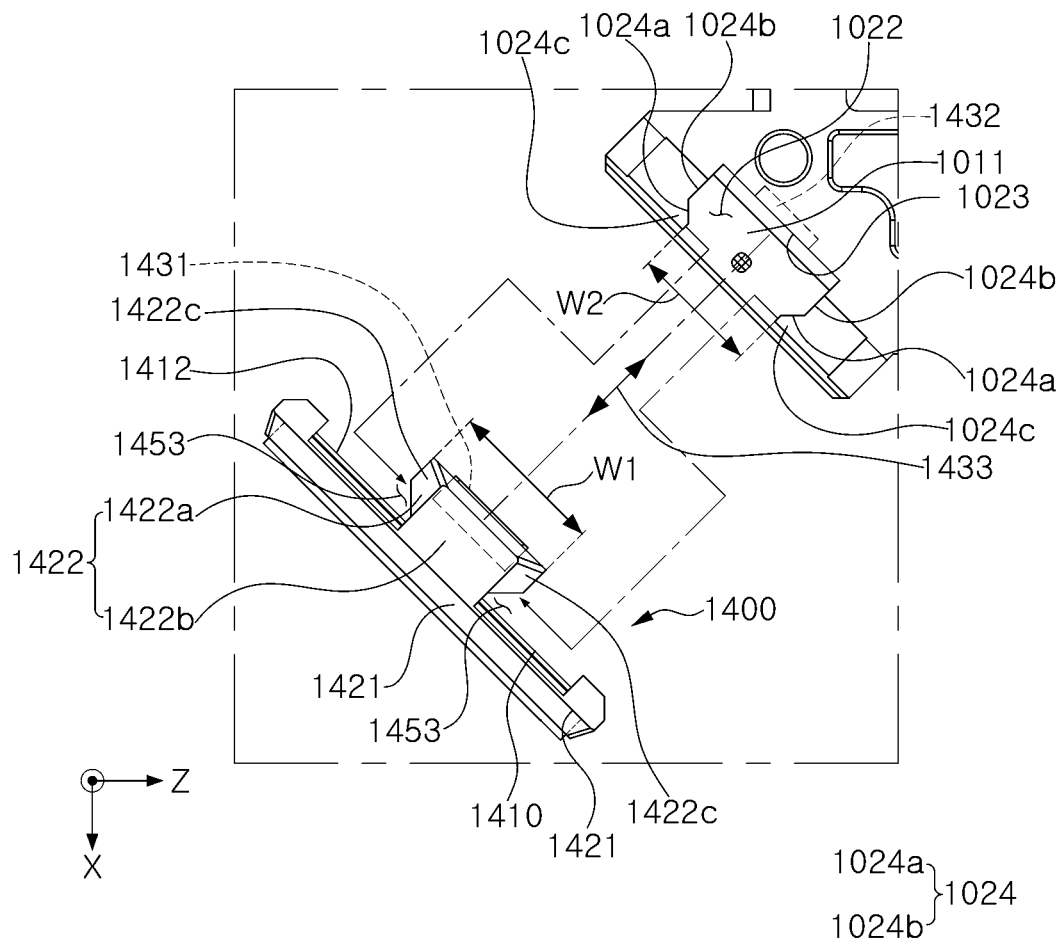
FIG. 11 illustrates a method in which a reflective module is accommodated in a support wall according to an example embodiment.
Figure 12:
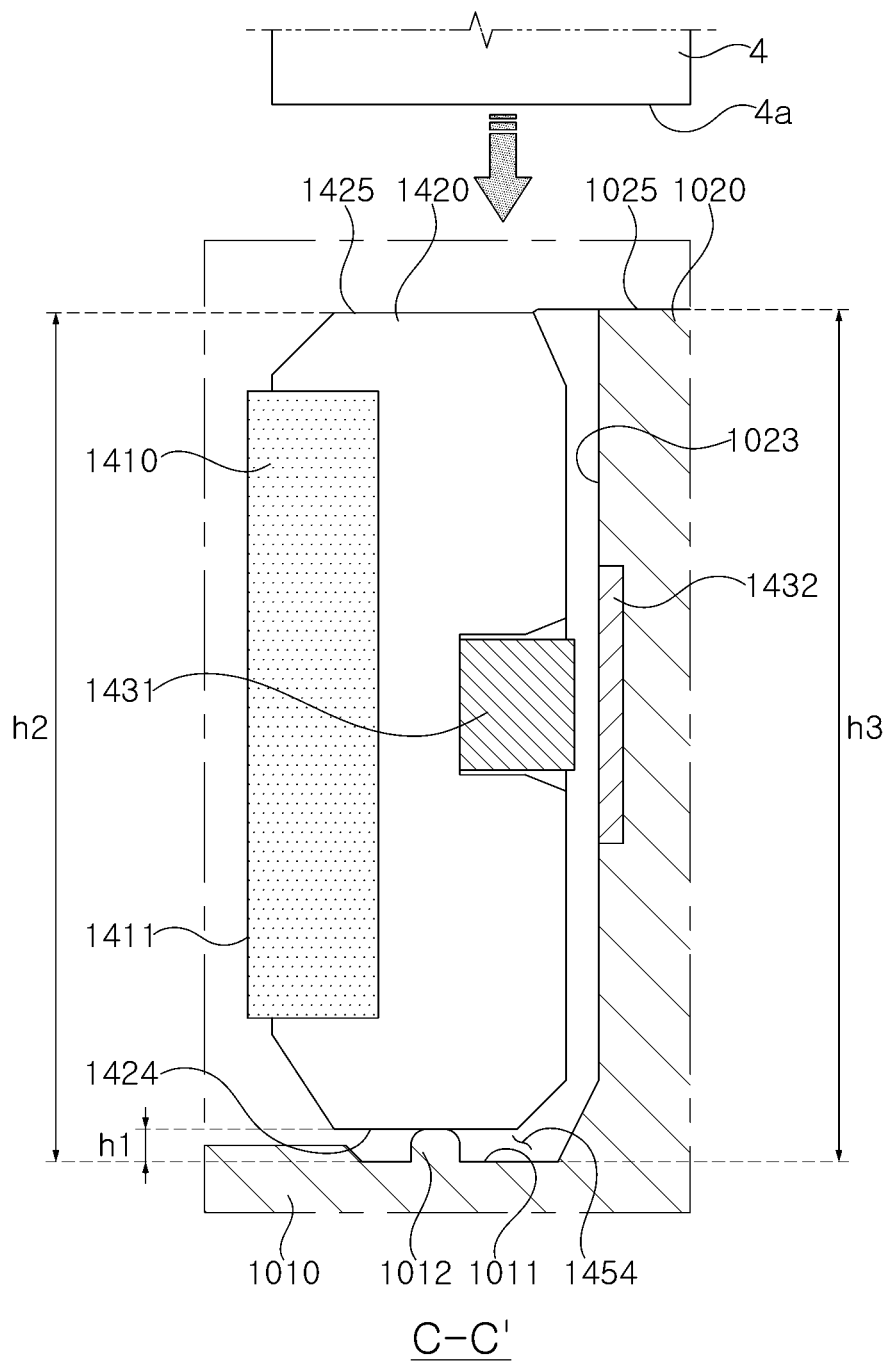
FIG. 12 illustrates a structure supporting a lower portion of a reflective module in an example embodiment.

FIG. 11 illustrates a method in which a reflective module is accommodated in a support wall in an example embodiment. FIG. 12 illustrates a structure supporting a lower portion of the reflective module 1400 in an example embodiment. FIG. 12 is a cross-sectional view taken along line C-C' of FIG. 6.

Referring to FIG. 11, in an example embodiment, the holder 1420 may be coupled to the housing 1010 through the coupling portion 1422.

In an example embodiment, the coupling portion 1422 may protrude further rearward than the rear surface 1412 of the first reflective member 1410. The support wall 1020 may include the accommodating recess 1022 that may accommodate at least a portion of the coupling portion 1422. For example, the coupling portion 1422 may protrude in the first direction relative to the rear surface 1412 of the first reflective member 1410, and the accommodating recess 1022 may be depressed in the first direction to accommodate the coupling portion 1422. Here, the protruding direction of the coupling portion 1422 or the depression direction of the accommodating recess 1022 may coincide with or substantially coincide with the direction of magnetic attraction between the first magnetic member 1431 and the second magnetic member 1432.

Referring to FIG. 12, in an example embodiment, the first magnetic member 1431 may be mounted on the coupling portion 1422, and the second magnetic member 1432 may be located on a surface facing the coupling portion 1422. For example, the second magnetic member 1432 may be exposed to the bottom surface 1023 partially defining the accommodating recess 1022 and disposed to face the first magnetic member 1431.

In an example embodiment, the accommodating recess 1022 and the coupling portion 1422 may be configured such that the coupling portion 1422 is prevented from being separated from the accommodating recess 1022 when the coupling portion 1422 is accommodated in the accommodating recess 1022.

In an example embodiment, the accommodating recess 1022 may extend upward from the bottom surface 1011, and the coupling portion 1422 may be configured to fit into the accommodating recess 1022 in a length direction of the accommodating recess 1022. The reflective module 1400 may be configured not to be released from the accommodating recess 1022 in a first direction 1433 in which at least the support wall 1020 and the first reflective member 1410 face each other, when fitted into the accommodating recess 1022 through the coupling portion 1422. Referring to FIGS. 9 and 11, for example, the accommodating recess 1022 may include a limiting portion 1024c extending in a direction perpendicular to the length direction (Z-axis direction) of the accommodating recess 1022, and the coupling portion 1422 may include an arresting portion 1422c configured to overlap the limiting portion 1024c in the first direction 1433. In a state in which the coupling portion 1422 is accommodated in the accommodating recess 1022, movement of the coupling portion 1422 in the first direction 1433 is limited due to interference between the arresting portion 1422c and the limiting portion 1024c.

The accommodating recess 1022 may be defined by the bottom surface 1023 depressed from the wall surface 1021 and a side wall 1024 connecting the bottom surface 1023 and the wall surface 1021.

In an example embodiment, a distance between the side walls 1024 may be reduced in a direction toward the wall surface 1021. For example, a portion (or an upper side wall 1024a) of the side wall 1024 adjacent to the wall surface 1021 may further extend toward the opposite side wall 1024 than a portion (or a lower side wall 1024b) of the side wall 1024 adjacent to the bottom surface 1023. Accordingly, a distance between the upper side walls 1024a may be smaller than a distance between the lower side walls 1024b.

For another example, the upper side wall 1024a of the accommodating recess 1022 may include an inclined surface, and a width of the accommodating recess 1022 may become narrow toward the wall surface 1021 by the inclined surface.

In an example embodiment, the coupling portion 1422 may include extending portions 1422a extending rearward of the base 1421, respectively, from the upper frame 1421U and the lower frame 1421L of the base 1421 and a bridge 1422b connecting the extending portions 1422a.

In an example embodiment, when the bridge 1422b of the coupling portion 1422 is assembled into the accommodating recess 1022, a portion of the upper side wall 1024a of the accommodating recess 1022 may be located in a space 1453 between the bridge 1422b and the rear surface 1412 of the first reflective member 1410. In an example embodiment, a width W1 of the bridge 1422b is larger than a distance W2 between the upper side walls 1024a, and accordingly, the coupling portion 1422 may be prevented from being separated from the accommodating recess 1022.

In an example embodiment, the bridge 1422b may have a shape corresponding to the accommodating recess 1022. For example, the accommodating recess 1022 may have a width decreasing in a direction toward the wall surface 1021, and the bridge 1422b may have a width increasing in a direction away from the base 1421. For example, the bridge 1422b may include an inclined surface corresponding to the inclined surface of the upper side wall 1024a.

Referring to FIG. 12, in an example embodiment, the holder 1420 may be supported at one point on the bottom surface 1011 of the housing 1010. In an example embodiment, the lower surface 1424 of the reflective module 1400 may be in point contact at one point or surface contact with a narrow area in the housing 1010.

In an example embodiment, the bottom surface 1011 of the housing 1010 may include a single projection 1012 extending toward the reflective module 1400. In an example embodiment, an end of the projection 1012 may contact a lower surface 1424 of the holder 1420. The projection 1012 may provide bearing power to the holder 1420 in the Y-axis direction. In an example embodiment, an air gap 1454 may exist between a portion of the lower surface 1424 of the reflective module 1400, except for a portion that contacts the projection 1012, and the bottom surface 1011 of the housing 1010.

It is difficult for the lower surface 1424 of the reflective module 1400 and the bottom surface 1011 of the housing 1010 to be worked to have a perfect surface. Thus, when the reflective module 1400 is seated on the bottom surface 1011 of the housing 1010, the first reflective member 1410 may be inclined in an unintended direction due to tolerance. In the example embodiment in the present disclosure, the reflective module 1400 may be supported at one point by the projection 1012, and thus, inclination of the first reflective member 1410 due to tolerance may be prevented.

Meanwhile, in an example embodiment, since the lower surface 1424 of the reflective module 1400 is supported at one point by the projection 1012, the reflective module 1400 may rotate around the projection 1012 during an assembly process (Of course, since the first reflective member 1410 is supported by the support wall 1020, even if the reflective module 1400 rotates around the projection 1012, an angle between the reflective surface 1411 and the optical axis 1201 may be maintained).

In order to solve this problem, in an example embodiment, a height h1 of the projection 1012 may be determined such that the upper surface 1425 of the reflective module 1400 is substantially parallel to the upper surface 1025 of the support wall 1020 when the reflective module 1400 is normally attached to the housing 1010.

In an example embodiment, when the reflective module 1400 is normally attached to the housing 1010, the upper surface 1425 of the reflective module 1400 may be provided substantially in the same plane as the upper surface 1025 of the support wall 1020. For example, when the reflective module 1400 is supported by the projection 1012 and the support wall 1020, the distance h2 between the upper surface 1425 of the reflective module 1400 and the bottom surface 1011 of the housing 1010 may be approximately equal to a distance h3 between the upper surface 1025 of the support wall 1020 and the bottom surface 1011 of the housing 1010.

When the upper surface 1425 of the reflective module 1400 is provided on approximately the same plane as the upper surface 1025 of the support wall 1020, a plane 4a provided in a tool 4 may press the support wall 1020 and the reflective module 1400 together during an assembly process. When the tool 4 contacts the upper surface 1025 of the support wall 1020, the reflective module 1400 may be positioned such that the upper surface 1425 is substantially parallel to the plane 4a of the tool 4. As a result, the upper surface 1425 of the reflective module 1400 is positioned to substantially match the upper surface 1025 of the support wall 1020, and the reflective module 1400 may be attached to the support wall 1020 in an accurate posture.

In an example embodiment, after the posture of the reflective module 1400 is adjusted by the tool 4, an adhesive member for fixing and coupling the reflective module 1400 to the support wall 1020 may be applied. The adhesive member may be disposed in at least a portion of an air gap between the reflective module 1400 and the support wall 1020 (e.g., the air gaps 1451 and 1452 of FIG. 8), the space 1440 of FIG. 10, the air gap 1453 of FIG. 11, and the air gap 1454 of FIG. 12.

According to an example embodiment in the present disclosure, the camera may have a relatively long total track length, and such a camera may provide high zoom magnification.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing;
a folded module configured to change a direction of light incident on the housing; and
a reflective module configured to change a direction of light that has been changed by the folded module,
wherein the reflective module comprises:
a first reflective member having a reflective surface;
a holder fixedly coupled to the first reflective member;
a first magnetic member mounted on the holder; and
a second magnetic member mounted in the housing, facing the first reflective member, and spaced apart from the first magnetic member,
wherein magnetic attraction between the first magnetic member and the second magnetic member is in a direction perpendicular to the reflective surface.

2. The camera module of claim 1, wherein
the first reflective member is pulled toward a support wall by magnetic attraction between the first magnetic member and the second magnetic member, and the first reflective member is supported in a contact portion between the reflective member and the support wall.

3. The camera module of claim 2, wherein
the first reflective member and the support wall face each other in a first direction,
the first reflective member is pulled toward the support wall in the first direction by magnetic attraction between the first magnetic member and the second magnetic member, and
the holder is configured such that a gap exists between the support wall and the holder when the first reflective member is seated on the support wall.

4. The camera module of claim 2, further comprising:
a lens module including a lens system arranged in an optical axis,
wherein the support wall extends from a bottom surface of the housing to a height corresponding to the first reflective member, and
wherein the support wall is disposed such that a direction in which the reflective surface faces has an angle of 45 degrees with respect to an optical axis of the lens module when the first reflective member is seated on the support wall.

5. The camera module of claim 2, wherein
the contact portion includes a contact point or a contact surface located on both sides of a region in which the magnetic attraction works.

6. The camera module of claim 2, wherein
the support wall includes an accommodating recess accommodating a portion of the holder, and the first magnetic member is mounted in the portion accommodated in the accommodating recess.

7. The camera module of claim 6, wherein
the portion of the holder includes a coupling portion protruding in a first direction,
the accommodating recess is depressed in the first direction to accommodate the coupling portion, and
the first magnetic member is mounted in a portion of the coupling portion of the holder facing in the first direction.

8. The camera module of claim 7, wherein
the accommodating recess extends in a second direction substantially perpendicular to the first direction, and the coupling portion is configured to be fit into the accommodating recess in the second direction.

9. The camera module of claim 8, wherein
the accommodating recess includes a limiting portion extending in a third direction substantially perpendicular to the second direction,
the coupling portion includes an arresting portion overlapping the limiting portion in the first direction, and
movement of the coupling portion in the first direction is limited by an interference between the arresting portion and the limiting portion in a state in which the coupling portion is accommodated in the accommodating recess.

10. The camera module of claim 2, wherein
the holder includes an opening exposing a partial surface of the first reflective member toward the support wall, and
the partial surface of the first reflective member exposed through the opening is in contact with the support wall.

11. The camera module of claim 2, wherein
the housing includes a projection protruding toward a surface of the reflective module from a bottom surface thereof, and
the reflective module is partially supported by a contact portion with an end portion of the projection.

12. The camera module of claim 11, wherein
the projection is in contact with the holder accommodated in an accommodating recess of the support wall to support the reflective module.

13. The camera module of claim 2, further comprising:
an adhesive member filling at least a portion of a gap between the first reflective member and the support wall.

14. The camera module of claim 1, further comprising:
a lens module including a lens system arranged along an optical axis; and
a second reflective member reflecting light incident from the outside toward the lens module.

15. The camera module of claim 14, wherein
the second reflective member is configured to change light incident in a first direction into light in a second direction, and
the first reflective member is configured to change light incident in the second direction into light in a direction substantially perpendicular to both the first direction and the second direction.

16. A portable electronic device comprising:
the camera module of claim 1; and
an image sensor,
wherein the image sensor comprises a light collecting surface facing the reflective member to generate a digital signal corresponding to light reflected from the reflective member.

17. A camera module comprising:
a housing;
a lens module accommodated in the housing;
a folded module configured to direct light incident on the housing toward the lens module;
a reflective member configured to change a direction of light that has passed through the lens module and incident to a front surface of the reflective member to a first direction intersecting an optical axis of the lens module, and provided as a flat plate; and a support wall provided as a portion of the housing and providing a surface on which the reflective member is seated, wherein the reflective member is pulled toward the support wall by magnetic force, and wherein a portion of a rear surface of the reflective member is in direct contact with the support wall.

18. A camera module comprising:

a housing comprising a support wall;

a folded module configured to change a direction of light incident on the housing;

a reflective member disposed in a holder and in direct contact with the support wall, and configured to change a direction of light that has been changed by the folded module;

a first magnetic member disposed in the support wall;

a second magnetic member disposed in the holder and spaced apart from the first magnetic member, wherein the first magnetic member and the second magnetic member pull the holder to the support wall by magnetic force; and an adhesive member disposed in a gap between the reflective member and the support wall to fix the reflective member to the support wall, wherein magnetic force between the first magnetic member and the second magnetic member is in a direction perpendicular to a reflective surface of the reflective member.

19. The camera module of claim 18, wherein the housing includes a projection protruding from a bottom surface of the housing toward the reflective member disposed in the holder, and a bottom surface of the reflective member disposed in the holder is supported by the projection.

20. The camera module of claim 18, wherein the holder comprises a reverse tapered protrusion and the support wall comprises a reverse tapered accommodating recess to receive the protrusion.

* * * * *